United States Patent
Ramandev et al.

(10) Patent No.: US 10,850,917 B2
(45) Date of Patent: Dec. 1, 2020

(54) MOBILE DEHYDRATOR AND METHOD OF USE THEREOF

(71) Applicant: RICH NATURALS INC., Victoria (CA)

(72) Inventors: Jaya P. Ramandev, Victoria (CA); C. Gerry Carrington, Dunedin (NZ); Ian Well, Victoria (CA)

(73) Assignee: Rich Naturals Inc., Victoria (CA)

( * ) Notice: Subject to any disclaimer, the term of this patent is extended or adjusted under 35 U.S.C. 154(b) by 41 days.

(21) Appl. No.: 16/344,785

(22) PCT Filed: Oct. 17, 2017

(86) PCT No.: PCT/CA2017/000230
§ 371 (c)(1),
(2) Date: Apr. 24, 2019

(87) PCT Pub. No.: WO2018/081888
PCT Pub. Date: May 11, 2018

(65) Prior Publication Data
US 2019/0337715 A1    Nov. 7, 2019

(30) Foreign Application Priority Data
Nov. 1, 2016  (CA) ...................................... 2947373

(51) Int. Cl.
*F26B 9/06* (2006.01)
*F26B 21/08* (2006.01)
(Continued)

(52) U.S. Cl.
CPC .......... *B65D 88/747* (2013.01); *A23B 7/0205* (2013.01); *A23L 3/40* (2013.01);
(Continued)

(58) Field of Classification Search
CPC ........ F26B 9/066; F26B 21/08; F26B 25/066; B65D 88/747; B65D 90/02;
(Continued)

(56) References Cited

U.S. PATENT DOCUMENTS 3,228,205 A * 1/1966 Franklin ................. F25D 16/00
                                                                    62/237
4,192,081 A * 3/1980 Erickson ................. F26B 9/066
                                                                    34/225
(Continued)

FOREIGN PATENT DOCUMENTS

CA    2947373 A1 *  5/2018  ............. B65D 90/02
EP    2749169 A4 *  7/2015  ............. A23B 4/031
(Continued)

OTHER PUBLICATIONS

WIPO, Canadian International Searching Authority, International Search Report dated Jan. 24, 2018, International Patent Application No. PCT/CA2017000230, 3 Pages.
(Continued)

*Primary Examiner* — Stephen M Gravini
(74) *Attorney, Agent, or Firm* — Baumgartner Patent Law; Marc Baumgartner

(57) ABSTRACT

A fully self-contained, portable product dehydrator is provided comprising: an intermodal container housing an equipment module, the equipment module including a refrigeration equipment chamber proximate the front door and an air conditioning chamber behind the refrigeration equipment chamber, the equipment module retained in the interior and moveable from a retracted position to an extended position, wherein when in the extended position, the refrigeration equipment chamber is substantially exposed to an ambient environment, outside the front door; a heat pump dehumidifier including a subcooler, a desuperheater, electronic expansion valve and a compressor, housed (Continued)

in the refrigeration equipment chamber and at least two condensers and evaporator housed in the air conditioning chamber; a drying chamber, the drying chamber defined by the interior and the rear door; a motor control center; and a control panel; in electronic communication with the heat pump dehumidifier and the fans.

20 Claims, 8 Drawing Sheets

(51) Int. Cl.
F26B 25/06 (2006.01)
B65D 88/74 (2006.01)
A23B 7/02 (2006.01)
A23L 3/40 (2006.01)
B65D 90/02 (2019.01)
F25D 15/00 (2006.01)

(52) U.S. Cl.
CPC ............ B65D 90/02 (2013.01); F25D 15/00 (2013.01); F26B 9/066 (2013.01); F26B 21/08 (2013.01); F26B 25/066 (2013.01); B65D 2588/746 (2013.01)

(58) Field of Classification Search
CPC ... B65D 2588/746; A23B 7/0205; A23L 3/40; A23L 23/40; F25D 15/00; F25D 15/06
USPC .......................................................... 34/233
See application file for complete search history.

(56) References Cited

U.S. PATENT DOCUMENTS

| | | | | |
|---|---|---|---|---|
| 4,531,306 A * | 7/1985 | Erickson | ................. | F26B 25/22 34/225 |
| 5,031,690 A * | 7/1991 | Anderson | ............ | B60H 1/3226 165/43 |
| 5,558,010 A * | 9/1996 | Shelton | ................. | A21C 13/00 126/21 A |
| 5,600,899 A | 2/1997 | Stevens et al. | | |
| 5,666,742 A * | 9/1997 | Greve | .................... | F25D 15/00 34/218 |
| 5,755,040 A * | 5/1998 | Ou | ........................ | A47L 23/205 34/202 |
| 6,115,939 A * | 9/2000 | Kuster | .................... | F26B 15/04 34/194 |
| 6,615,908 B1 * | 9/2003 | Bosher | ................. | A23L 3/3418 165/48.1 |
| 6,789,391 B2 * | 9/2004 | Graham | ................. | F25D 3/105 62/223 |
| 7,089,683 B1 * | 8/2006 | Plestenjak | ............... | F26B 21/02 34/209 |
| 7,938,283 B2 * | 5/2011 | Villers | ...................... | B65B 1/16 220/1.5 |
| 8,196,310 B2 * | 6/2012 | McMahon | .............. | F26B 21/10 34/73 |
| 8,291,647 B2 * | 10/2012 | Esposito | ............... | E04H 1/1205 52/66 |
| 8,758,321 B2 * | 6/2014 | Stacey | .................... | F25D 15/00 604/403 |
| 9,420,823 B2 * | 8/2016 | Lee | ......................... | F26B 21/10 |
| 9,718,612 B2 * | 8/2017 | Ueno | ................... | B65D 88/747 |
| 10,041,203 B2 * | 8/2018 | Ahn | ...................... | D06F 58/206 |
| 10,412,980 B2 * | 9/2019 | Palese | ...................... | A23L 3/40 |
| 2005/0160620 A1 * | 7/2005 | Morgan | ................ | F26B 21/001 34/469 |
| 2006/0179676 A1 * | 8/2006 | Goldberg | .............. | D06F 58/206 34/77 |
| 2007/0175236 A1 * | 8/2007 | Dryzun | ................. | F25D 11/006 62/371 |
| 2014/0193548 A1 * | 7/2014 | Godoy Varo | ......... | A23L 3/3445 426/231 |
| 2015/0272199 A1 | 10/2015 | Barrows | | |
| 2016/0223257 A1 * | 8/2016 | Romanek | .................. | F26B 3/28 |
| 2018/0064147 A1 * | 3/2018 | Backus | .................. | F26B 9/003 |
| 2019/0161277 A1 * | 5/2019 | Pap | ........................ | B65D 90/06 |
| 2019/0310017 A1 * | 10/2019 | Krebs | ................... | F26B 23/005 |
| 2019/0337715 A1 * | 11/2019 | Ramandev | ............. | F26B 21/08 |
| 2020/0085085 A1 * | 3/2020 | Reed | .................... | F26B 25/066 |

FOREIGN PATENT DOCUMENTS

| | | | | |
|---|---|---|---|---|
| EP | 2881685 B1 * | 3/2019 | .......... | B65D 88/745 |
| JP | 5370551 B1 * | 12/2013 | .......... | B65D 88/747 |
| WO | 1998/053711 | 12/1998 | | |
| WO | 2000/036344 | 6/2000 | | |
| WO | 2001/084067 | 11/2001 | | |
| WO | 2005/084450 | 1/2006 | | |
| WO | WO-2010132627 A3 * | 5/2011 | ............. | F25D 17/06 |
| WO | WO-2013021086 A3 * | 5/2013 | ............... | A23L 3/40 |
| WO | WO-2014020856 A1 * | 2/2014 | ........... | B65D 88/747 |

OTHER PUBLICATIONS

WIPO, Canadian International Searching Authority, Written Opinion of the International Searching Authority dated Jan. 24, 2018, International Patent Application No. PCT/CA2017000230, 3 Pages.

* cited by examiner

MOBILE DEHYDRATOR AND METHOD OF USE THEREOF

CROSS REFERENCE TO RELATED APPLICATIONS

The present invention is filed under 35 U.S.C. § 371 as the U.S. national phase of International Application No. PCT/CA2017/000230, filed Oct. 17, 2017, which designated the U.S. and claims the benefit of Canadian Patent Application Serial No. 2,947,373, filed on Nov. 1, 2016 and entitled "MOBILE DEHYDRATOR AND METHOD OF USE THEREOF", each of which is hereby incorporated in its entirety including all tables, figures, and claims.

FIELD

The present technology relates to a mobile dehydrator for fruits, vegetables, herbs, plants, including, but not limited to flowers, leaves, roots, intact plants, pharmaceuticals, herbal remedies and nutraceuticals. More specifically, the technology an intermodal container with all the components of a dehydrator housed therein.

BACKGROUND

Dehydrators are used to produce dried fruits, vegetables and the like. An example of a dehydrator is disclosed in WO/2005/084450 which relates to a method of drying a biodegradable material, such as a plant or animal product, comprising: a. Pretreating the material to reduce enzymatic degradation and/or microbial, particularly bacterial, attack; and b. Subjecting the material to drying conditions. It also relates to a process for drying oily fish, such as salmon and other pelagic species, comprising: i) Pretreating the material to reduce the oil content of the material; and ii) Subjecting the material to drying conditions. These and other drying processes are preferably conducted in a drying apparatus of the invention. The closed loop drying apparatus comprises a drying chamber having a floor, a ceiling, two end walls and two side walls. Incorporated towards the ceiling, and running substantially the whole length of the ceiling is some ducting. Located at one end of the drying chamber are two dehumidifying units each comprising an expansion chamber, a compressor and a heat exchanger. Mounted externally to the drying chambers are two external heat exchangers which are operatively linked with the dehumidifying unit. These are shown to be located on the outside of an exterior wall. Although it is stated that it could be a modified container that is loaded on a trailer, the apparatus would not be fully contained within the container, as the external heat exchangers are mounted on the outer side of the exterior wall to allow for proper cooling. The application does not contemplate the complexities and challenges of a fully self-contained dehydrator, nor does it teach how one would overcome the complexities and challenges of a fully self-contained dehydrator. For example, one of the constraints pertains to space. This application does not consider maximizing drying space.

WO0036344 discloses a modular versatile heat pump system for drying and air-conditioning. The refrigerating components of the heat pump, comprising the compressor, condenser, evaporators and expansion valves, are housed in a chassis with three interface ports for easy integration with any air-handling chamber via flexible industrial couplers. For drying application, the design makes use of conventional import/export transport containers with modification for loading and unloading of products. It adopts the first-in first-out process for loading and unloading of the products. For air-conditioning application, the present design can be coupled to the chamber to provide air-conditioning during system repair and maintenance. The proposed heat pump system has several advantages, namely, easy chamber scale-up to meet increase production, significant reduction of production down time, eliminate thermal discomfort during maintenance of refrigeration components for air conditioning systems. This technology allows for the heat pump system to be transported, but requires separate drying chambers, hence it is not a self-contained system that is suitable for shipping to on site locations.

WO9853711 discloses a dehydration plant for dehydrating food products, including a microwave kiln, a conveyor means for conveying food products through the kiln, circulation means for circulating air through the kiln, refrigerated dehumidification means for dehumidifying the air to be circulated through the kiln, and heating means for heating the air to be circulated through the kiln such that food products conveyed through the kiln are exposed to both microwave emissions and the flow of dehumidified heated air to thereby dehydrate the food products. Although this application claims the apparatus in a mobile container, the application does not contemplate the complexities and challenges of a fully self-contained dehydrator, nor does it teach how one would overcome the complexities and challenges of a fully self-contained dehydrator.

What is needed is a self-contained dehydrator plant that is configured for drying commercial quantities of fruit, vegetables, and other plant and animal material. The dehydrator would preferably be transportable. The dehydrator would preferably be an intermodal container with all the components needed for dehydrating housed therein. The intermodal container would preferably include a drying chamber and an equipment module. The equipment module would preferably be slidably mounted in the drying chamber for transport and extend out a sufficient distance from the container to allow for heat exchange when in use. The fans and heat pumps would preferably have sufficient capacity at acceptable power consumption levels to dry a commercially desirable volume of product, in an acceptable time with acceptable quality. The drying chamber would preferably be ductless to maximize space for product, reduce fan power usage and reduce maintenance costs.

SUMMARY

The present technology provides a self-contained dehydrator plant that is configured for drying commercial quantities of fruit, vegetables, and other plant and animal material. The dehydrator is an intermodal container that can be loaded on a truck, a ship or a train. The intermodal container includes a drying chamber and an equipment module. The equipment module is slidably mounted in the drying chamber for transport and extends out a sufficient distance from the container to allow for heat exchange when in use. The fans and heat pumps have sufficient capacity at acceptable power consumption levels to dry a commercially desirable volume of product, in an acceptable time with acceptable quality. The drying chamber is ductless to maximize space for product, reduce fan power usage and reduce maintenance costs.

The present technology provides the following objectives:
a. The commercially desired volume of product;

b. Acceptable energy efficiency and drying capacity in the heat pump with acceptable intrusion on the volume available to the product;

c. Sufficient capacity in the heat pump to dry the product to the desired moisture level fast enough to be commercially interesting; and d. Sufficient air-flow rate through the product without generating excessively high fan power demands.

In one embodiment, a fully self-contained, portable product dehydrator is provided comprising: an intermodal container including a rear door, a front door, a ceiling, a floor, and walls therebetween to define an interior; an equipment module, the interior housing the equipment module, the equipment module including a refrigeration equipment chamber proximate the front door and an air conditioning chamber behind the refrigeration equipment chamber, the equipment module retained in the interior and moveable from a retracted position to an extended position, wherein when in the extended position, the refrigeration equipment chamber is substantially exposed to an ambient environment, outside the front door; a heat pump dehumidifier including a subcooler, a desuperheater, at least two condensers, a compressor, an expansion valve and an evaporator, all in fluid communication; the subcooler, the desuperheater, the expansion valve and the compressor housed in the refrigeration equipment chamber and at least two condensers and the evaporator housed in the air conditioning chamber, the air conditioning chamber including a front partition wall and a bank of fans in the rear wall, the bank of fans in fluid communication with the air conditioning chamber and the drying chamber; a drying chamber, the drying chamber defined by the interior and the rear door; a motor control center and a control panel, both in electronic communication with the heat pump dehumidifier and the fans.

The dehydrator may further comprise a racking system, the racking system housed in the drying chamber, the racking system including a plurality of carts, each with a plurality of racks, and a plurality of trays, the trays releasably retained on the racks.

In the dehydrator, the racking system and the ceiling may define an upper ductless air channel, the racking system and the floor may define a lower ductless air channel and the racking system and the rear door may define a rear ductless air channel, the rear ductless air channel in fluid communication with the upper and the lower air channels, the air channels in fluid communication with the bank of fans.

In the dehydrator, the evaporator and condensers may be mounted on a partition wall to provide a barrier to air between the air conditioning chamber and the refrigeration equipment chamber.

The dehydrator may further comprise a pair of adjustable dampers, each damper mounted in an air channel, such that an amount of air flow to the evaporator and to the condensers is modulated.

In the dehydrator, the equipment module may be in slidable and rollable engagement with the intermodal container.

In the dehydrator, the heat pump dehumidifier may further include a plurality of valves including an electronic expansion valve, the plurality of valves housed in the refrigeration equipment chamber.

The dehydrator may further comprise a louvered door in a wall of the refrigeration equipment chamber to allow access and air flow to the subcooler and the desuperheater.

The dehydrator may further comprise an air mixing space defined by the evaporator, the two condensers and the bank of fans, the air mixing space in fluid communication with the bank of fans and the upper and the lower ductless air channels.

In the dehydrator, the fans may be reversible fans.

The dehydrator may further comprise a motor control center and a control panel in electronic communication with the heat pump dehumidifier, for controlling the heat pump dehumidifier.

The dehydrator may further comprise environmental sensors, the sensors in electronic communication with the control panel.

A method of drying a food product is also provided, the method comprising using the dehydrator described above to dry the food product.

In the method, the food product may be dried from about 85 percent moisture content to about 8 percent moisture content at a temperature between about 25° C. to about 50° C.

In another embodiment, a self-contained, portable product dehydrator is provided comprising: an intermodal container including a rear door, a front door, a ceiling, a floor, and walls therebetween to define an interior; an equipment module, the interior housing the equipment module, the equipment module retained in the interior and moveable from a retracted position to an extended position, wherein when in the extended position, a front portion of the equipment module is substantially exposed to an ambient environment, outside the front door; a heat pump dehumidifier housed in the equipment module, the equipment module including a partition wall; a bank of fans, the bank of fans located in the rear wall and in fluid communication with the equipment module and the drying chamber; a drying chamber, the drying chamber defined by the interior and the rear door; a motor control center; and a control panel in electronic communication with the heat pump dehumidifier and the fans.

In the dehydrator, the equipment module may include a refrigeration equipment chamber proximate the front door and an air conditioning chamber behind the refrigeration equipment chamber, wherein the refrigeration equipment chamber is substantially exposed to the ambient when in the extended position.

In the dehydrator, the heat pump dehumidifier may include a subcooler, a desuperheater, at least two condensers, at least one compressor, an electronic expansion valve and an evaporator, all in fluid communication; the subcooler, the desuperheater, electronic expansion valve and the compressor housed in the refrigeration equipment chamber and the at least two condensers and evaporator housed in the air conditioning chamber.

The dehydrator may further comprise a racking system, the racking system housed in the drying chamber, the racking system including a plurality of carts, each with a plurality of racks, and a plurality of trays, the trays releasably retained on the racks.

In the dehydrator, the racking system and the ceiling may define an upper ductless air channel, the racking system and the floor may define a lower ductless air channel and the racking system and the rear door may define a rear ductless air channel, the rear ductless air channel in fluid communication with the upper and the lower air channels, the air channels in fluid communication with the bank of fans.

In the dehydrator, the equipment module may be in slidable and rollable engagement with the intermodal container.

FIGURES

DESCRIPTION

Figure 1:
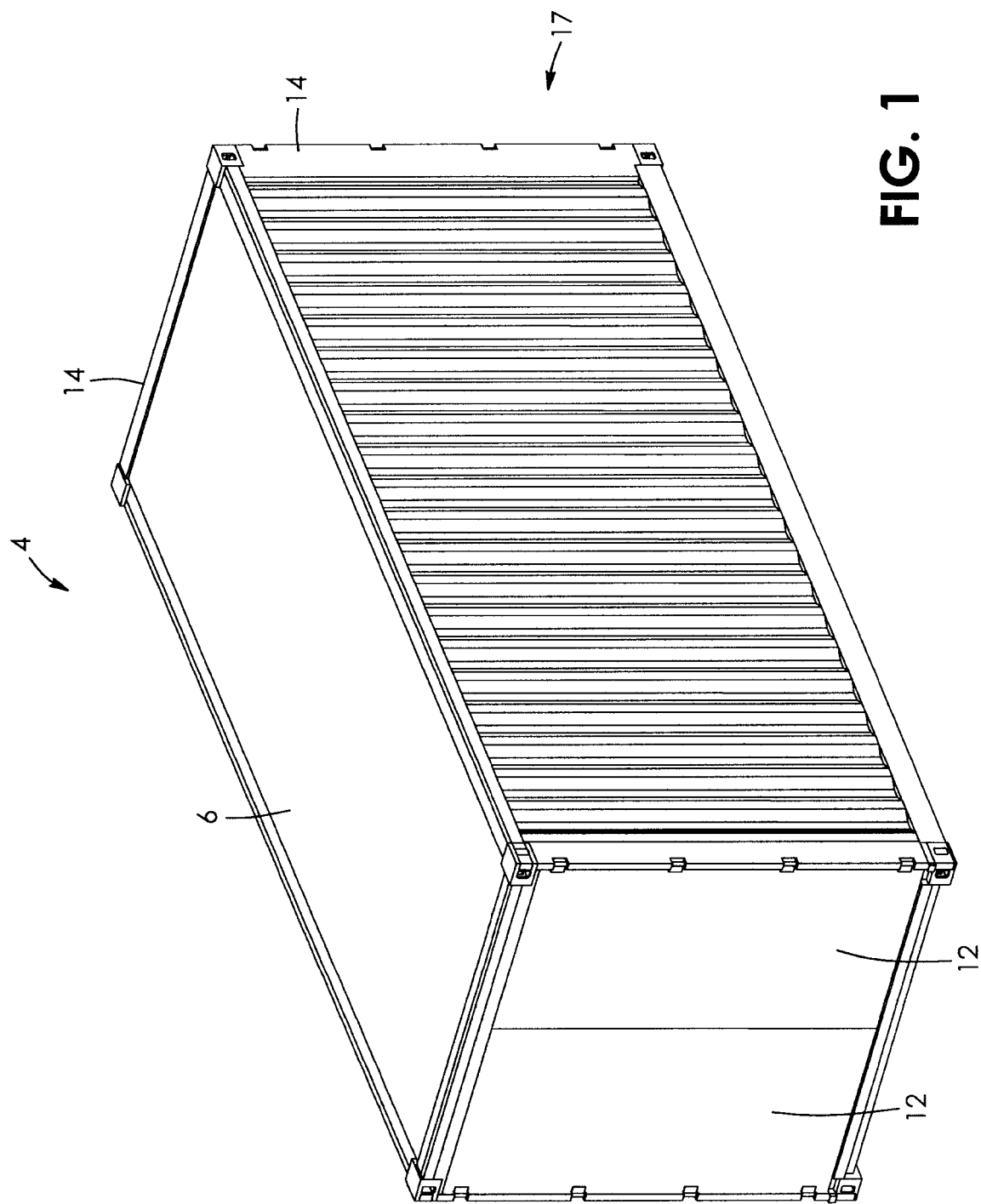
FIG. 1 is a perspective view of the dehydrator plant of the present technology.

Except as otherwise expressly provided, the following rules of interpretation apply to this specification (written description, claims and drawings): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open ended terms (i.e., meaning "including, but not limited to,") unless otherwise noted.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

Intermodal container: In the context of the present technology, an intermodal container is an ISO approved container for use in shipping. The containers have standardized sizes.

Product: In the context of the present technology, product is fruit, vegetables, and other plant and animal material, including, but not limited to whole plants, herbs, and nutraceuticals.

Ductless: In the context of the present technology, ductless means that there are no purpose built ducts, but rather they are defined by structures within the drying chamber, for example, the carts with their drying racks and trays, the floor and the ceiling.

Note that rear and front walls can be used interchangeably and only describe the preferred arrangement when the intermodal container is mounted on a truck.

DETAILED DESCRIPTION

The use of a shipping container for a packaged transportable dryer is attractive because it provides a potentially cost-effective structure for integrating and protecting the elements of the dryer. On the other hand, a standard 6.058 metre long by 2.591 metre tall, by 2.438 metres wide container imposes a highly restrictive and rigid volume constraint on the system design [the interior volume of such a container is 33.1 cubic meter (cu. m.)] Specifically, the demand for volume within the container arises from four competing factors:

a. Volume needed to support the required quantity of product and to ventilate the product;

b. Volume needed to move the required air flow;

c. Space to locate the fans;

d. Space for the heat pump heat exchangers; and e. Space for the compressor, heat rejection equipment, controls and power electrical equipment.

As shown in FIG. 1, in one embodiment, a dehydrator plant, generally referred to as 4, is an intermodal container 6, with front doors 12 and a pair of rear doors 14. The plant 4 is in the retracted (transport or storage) state 17.

Figure 2:
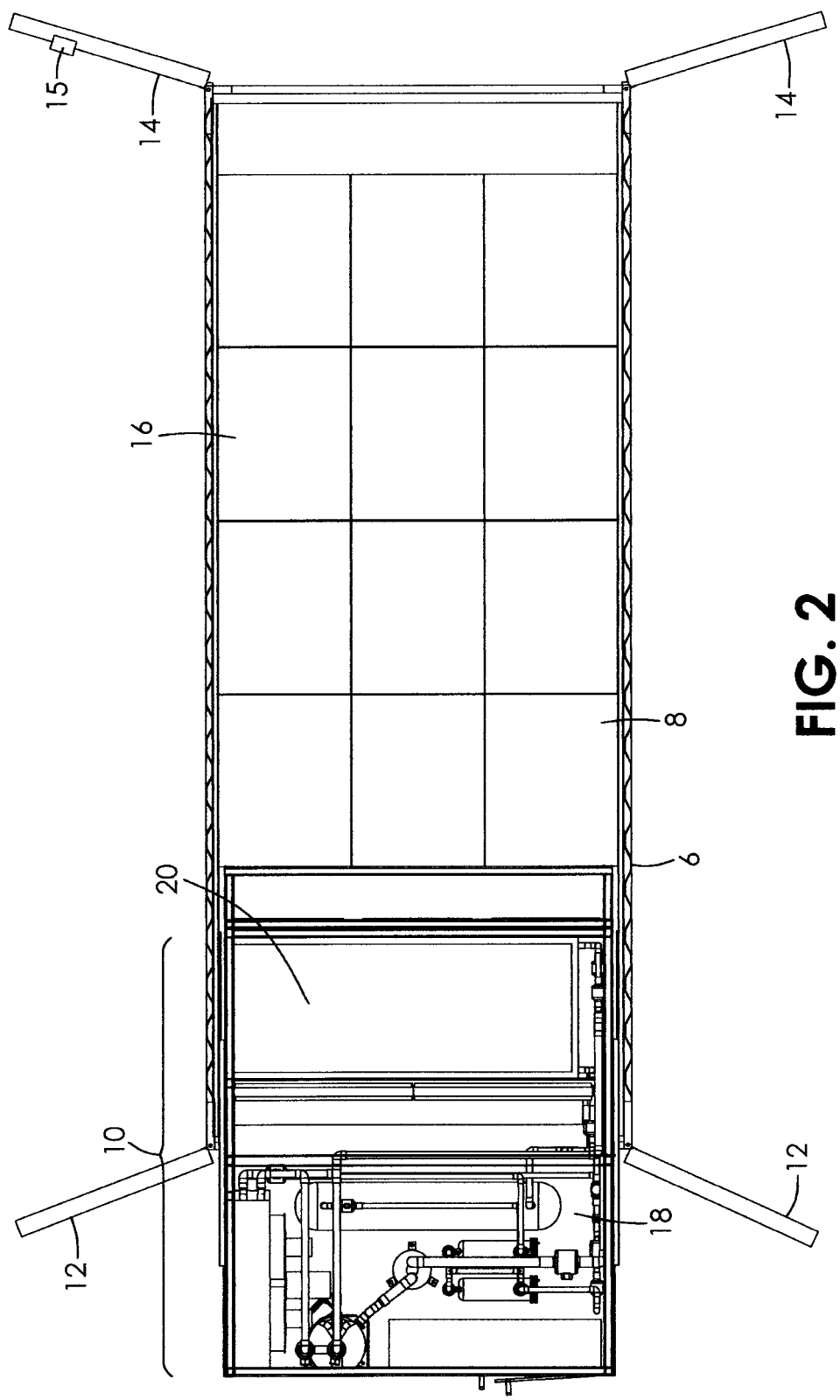
FIG. 2 is a sectional top view of the dehydrator plant of FIG. 1.

As shown in FIG. 2 (which shows the operational state), there is an interior 16 between the front and rear doors. The interior 16 defines a rear drying chamber 8 and houses a front equipment module, generally referred to as 10. The rear doors 14 allow for entry into the drying chamber 8 for loading and unloading the product. An operator interface terminal 15 is located on the rear door 14. The intermodal container 6, in this embodiment, is 6.058 metres long (20 feet container). The front equipment module 10 has a refrigeration equipment chamber 18 and an air conditioning chamber 20. The air conditioning chamber 20 is adjacent the drying chamber 8 and the refrigeration equipment chamber 18 is in front of the air conditioning chamber 20 adjacent the front doors 12.

Figure 3:
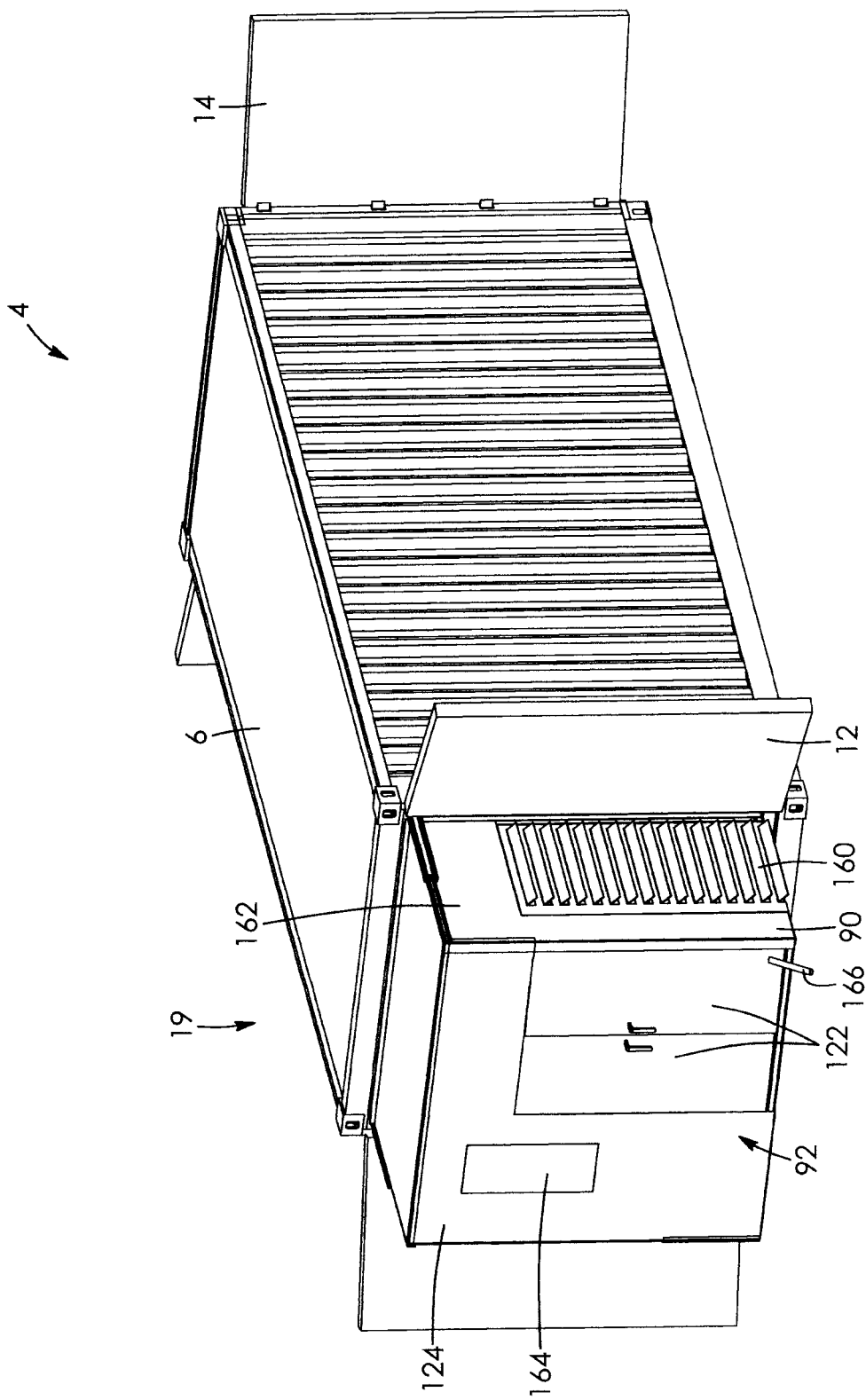
FIG. 3 is a perspective view of the dehydrator plant of FIG. 1 with the machinery chamber extended (in the operational state).

The expanded (operational) state 19 is shown in FIG. 3. In the expanded state, the refrigeration equipment chamber 18 is exposed to the ambient environment 92.

Figure 4:
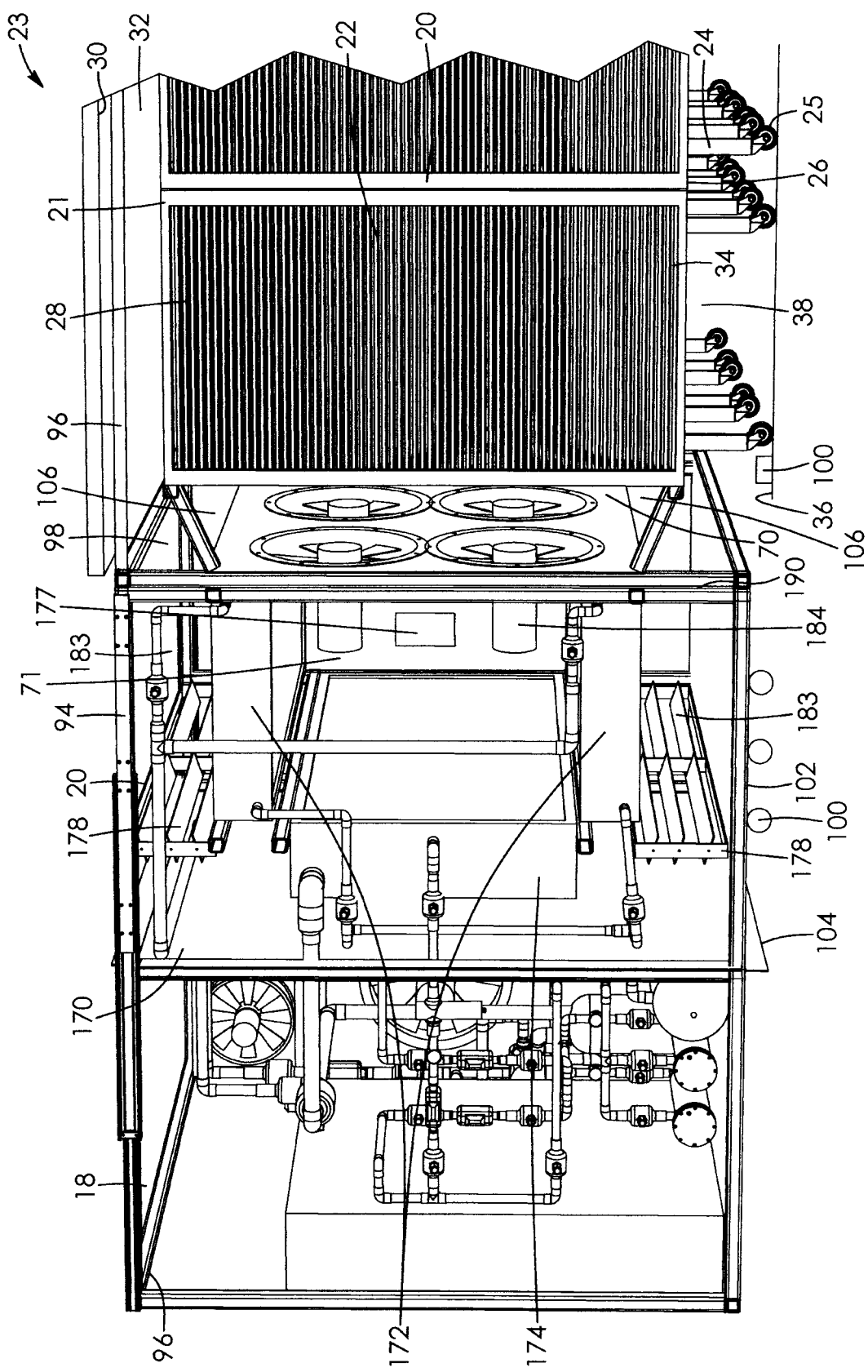
FIG. 4 is a longitudinal sectional view of the dehydrator plant of FIG. 1.
Figure 6:
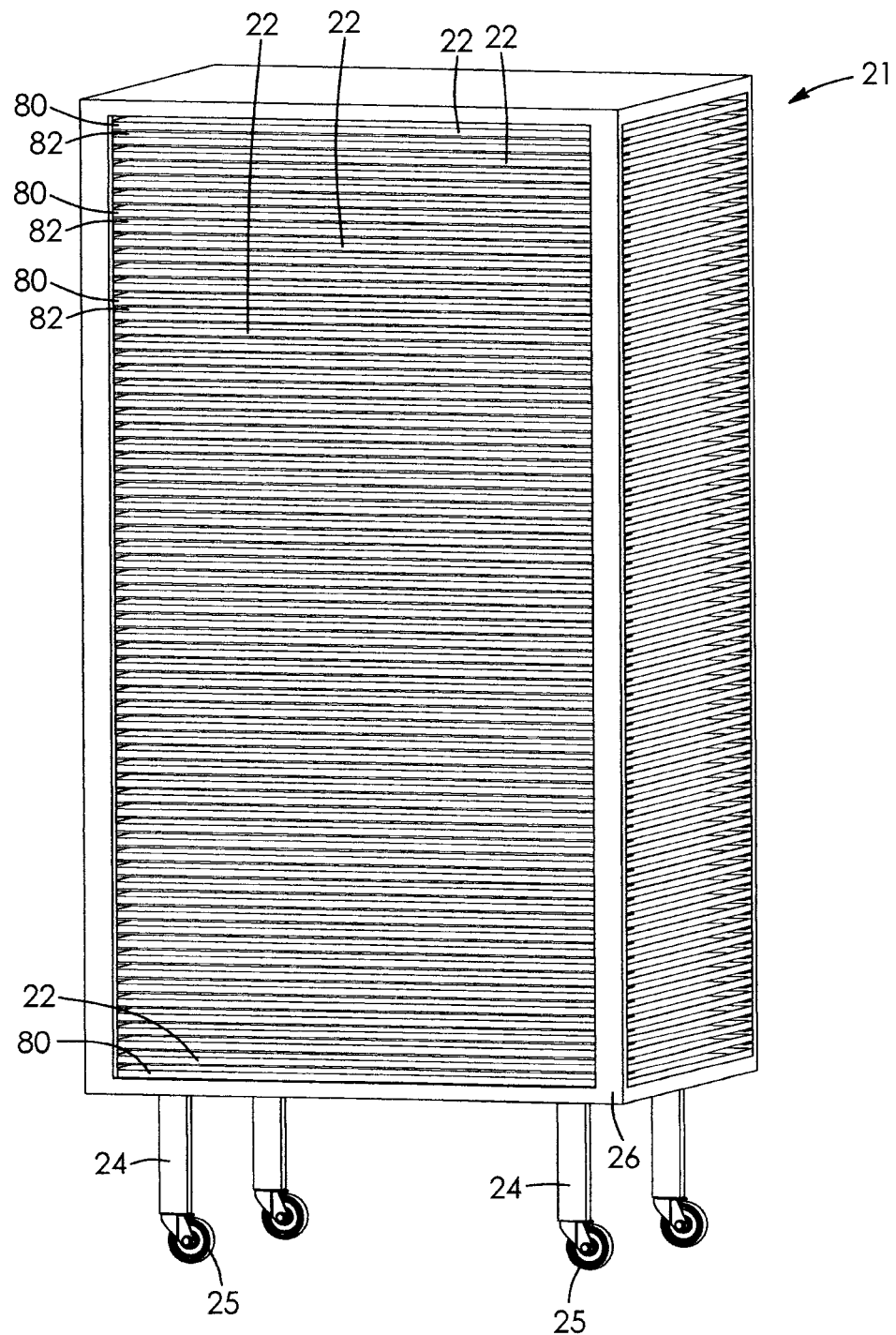
FIG. 6 is a perspective view of the racking in the drying chamber of the dehydrator plant of FIG. 1.

As shown in FIGS. 4 and 6, the drying chamber 8 has portable carts 21 with drying trays 22. These carts 21 with the drying trays 22, which are removable from the carts 21, occupy more than about 65 percent of the drying chamber 8 and are referred to as the rack system 23. The portable carts 21 have casters 25 on legs 24. The legs 24 are inset from the edges 26 of the carts 21 to allow for tight packing of the carts 21. The top tray 28 is located about 275 mm to about 325 mm, preferably about 295 to about 315 mm, most preferably about 304.8 millimeter (mm) from the ceiling 30 of the container 6 to create an upper ductless air channel 32 that is about 275 mm to about 325 mm, preferably about 295 to about 315 mm, most preferably about 304.8 millimeter (mm) deep. The bottom tray 34 is similarly about 275 mm to about 325 mm, preferably about 295 to about 315 mm, most preferably about 304.8 millimeter (mm) from the floor 36 of the container 6 to create a lower ductless air channel 38 that is about 275 mm to about 325 mm, preferably about 295 to about 315 mm, most preferably about 304.8 millimeter (mm) deep.

Figure 5:
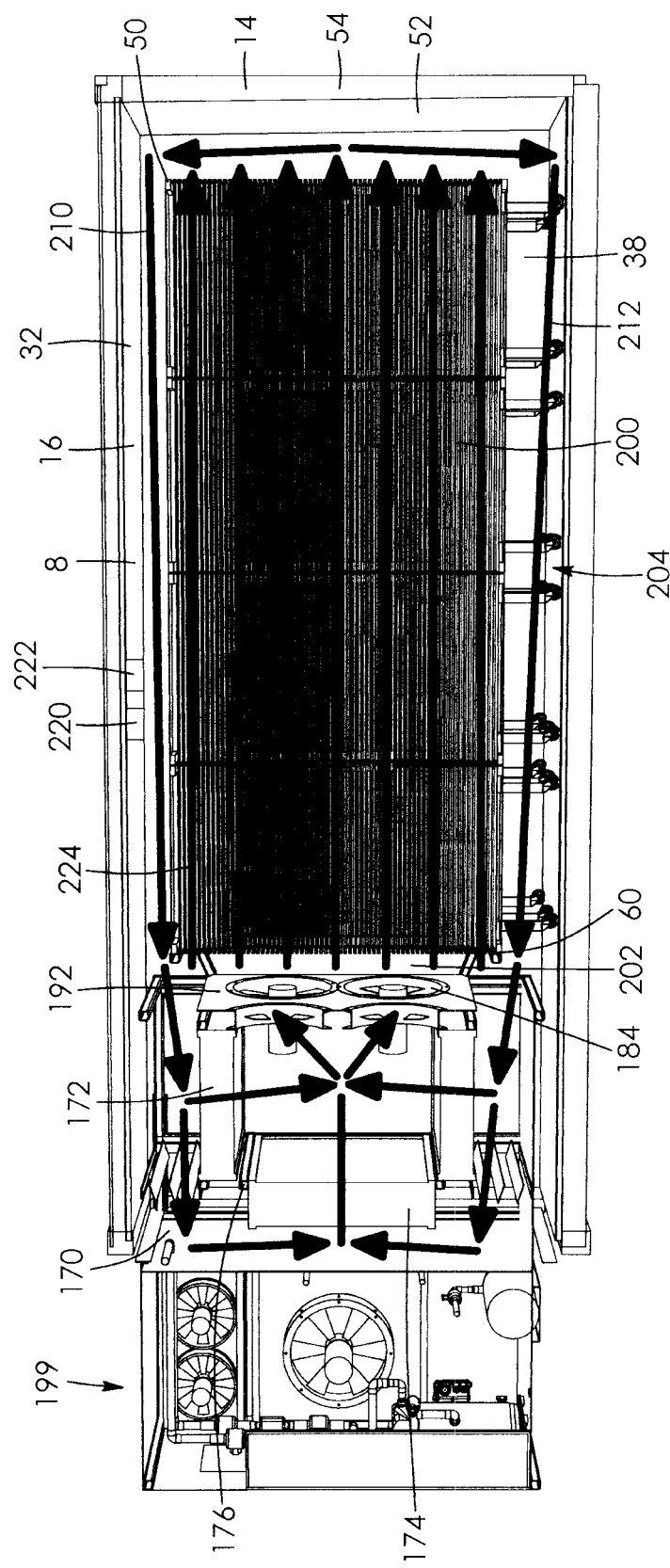
FIG. 5 is a side view showing air flow patterns through the dehydrator plant of FIG. 1.

As shown in FIG. 5, a space between the rear-most rack 50 and the rear doors 14 provides a rear ductless air channel 52. These ductless air channels 32, 38, 52 including the collapsible sheeting 106 (FIG. 4) mounted between the equipment module 10 and the front-most rack 60 replace the need for ducting, thus saving space and weight. They are for the return of air from the rear 54 of the drying chamber 8 to the air conditioning chamber 20 when the air flow is in forward direction and vice versa when the air flow is reversed. As shown in FIG. 4, the space between the evaporator 174 and the bank of fans 192 of the air conditioning chamber 20 defines the air mixing space 71 and the space between the front-most rack 60 and the entry end 202 (which is the rear wall 190 of the air conditioning chamber 20) of the drying chamber 8 is the extended air mixing space 70. The drying chamber 8 is insulated with an extruded polystyrene rigid insulation layer on the floor 36 to carry the weight of the product and carts and spray foam insulation on the walls and ceiling 30. The floor 36, walls and ceiling 30 have a steel surface for washdown.

The details of the carts 21 and drying trays 22 are shown in FIG. 6. The drying trays 22 are about 12 to about 13 millimeter (mm) high by 711.20 mm wide by 984.25 mm long. The portable carts 21 have racks 80 spaced at about 24 to about 25.4 mm apart, allowing for 66 trays 22 to be loaded on a cart 21. At least one of the carts 21 is collapsible. This is to accommodate the equipment module 10 when the dehydrator 4 is in the retracted position 17, as it is fully contained within the drying chamber 8. The gap 82 at 12.7 mm between the drying trays 22 allows for sufficient flow of the supply air flow to reduce or minimize pressure drop. It was initially thought that additional components would be needed to reduce pressure drops, but this was avoided by careful design of the racks 80. The preferred pressure drop for the fans 184 when the drying chamber 8 is fully loaded is about 250 Pascals or less.

Returning to FIG. 4, a slider system 94 is mounted proximate the top 96 of the equipment module 10 and on the inner wall 98 of the container 6, proximate the ceiling 30. A roller system 100 is mounted on the bottom 102 of the equipment module 10 and on the floor 36 of the container 6. This allows for the equipment module to be slid and rolled out of the container 6 to expose the refrigeration equipment chamber 18 to the ambient 92. A flex guard 104 is mounted on the bottom 102 and top 96 of the equipment module 10 to provide a substantially air-tight seal between the drying chamber 8 and the ambient 92. The partition wall 170 between the air conditioning chamber 20 and the refrigeration equipment chamber 18 is again to minimize air flow between the drying chamber 8 and the ambient 92.

Figure 7:
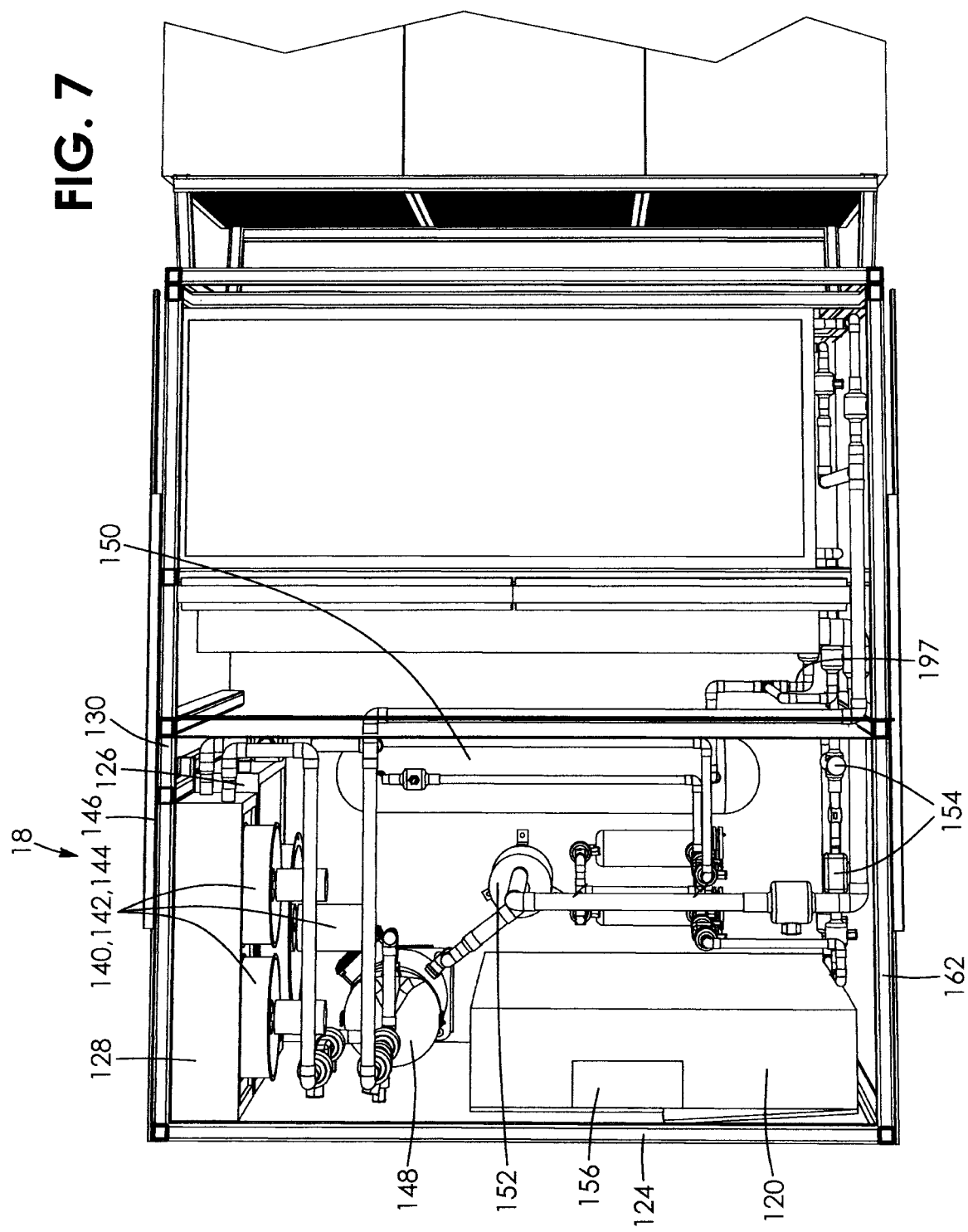
FIG. 7 is a sectional top view of the equipment module of FIG. 1.

As shown in FIG. 7, the refrigeration equipment chamber 18 houses a motor control center 120 that is protected from the ambient 92 with a pair of control panel doors 122 (see FIG. 3). The motor control center 120 is mounted on the front 124 of the refrigeration equipment chamber 18. A subcooler 126 and a desuperheater 128 are mounted on a first side wall 130 of the refrigeration equipment chamber 18, with their respective fans 140, 142, 144 extending through the first side wall 146 to the ambient 92. A compressor 148, a receiver 150, an accumulator 152 and valves 154 are also housed in the refrigeration equipment chamber 18. These are the components of the heat pump dehumidifier 199 that require maintenance and are therefore housed where they are readily accessible. A control panel 156 is housed in the motor control center 120 and is in electronic communication with the heat pump dehumidifier 199 and the fans 140, 142, 144, 184. Returning to FIG. 3, a louvered door 160 on the second side wall 162 of the refrigeration equipment chamber 18 allows a user access to the chamber 90 and air flow to the subcooler 126 and the desuperheater 128. A small panel 164 on the front 124 provides another access point. A discharge pipe 166 extends through the front wall 124 to the ambient environment 92.

As shown in FIGS. 4 and 5, a partition wall 170 divides the refrigeration equipment chamber 18 from the air conditioning chamber 20. Two condensers 172 and an evaporator 174 are mounted on a frame 176 proximate the partition wall 170. As shown in FIG. 4, adjustable dampers 178 are mounted between the condensers 172 and the ceiling 30 and the floor 36 of the air conditioning chamber 20 in the evaporator air channel 183.

Figure 8:
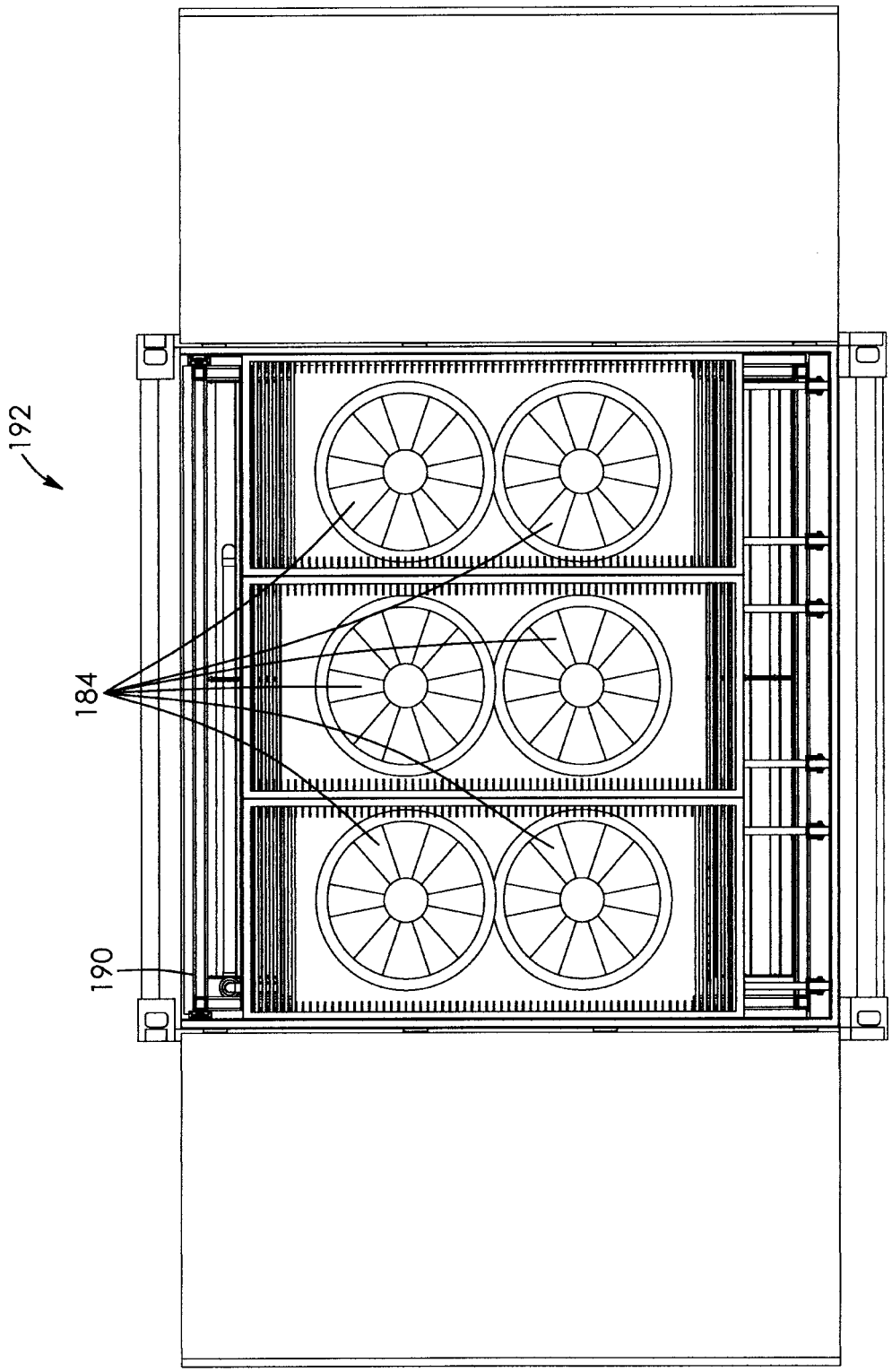
FIG. 8 is a face view of the fans of the dehydrator plant of FIG. 1.

As shown in FIGS. 4 and 8, a number of reversible fans 184, at least four and preferably six reversible fans 184 are located proximate the condensers 172 in a rear wall 190 of the equipment module 10. A 12 to 24 kilowatt electric heater 177 is located between the evaporator 174 and fans 184 in the air conditioning chamber 20.

As shown in FIG. 8, the reversible fans 184 are arranged in a bank, generally referred to as 192. The use of a number of fans improves the uniformity of the air-streams returning to the drying racks 80. The fans are reversed every one to four hours to improve the uniformity of product drying.

As shown in FIG. 7, the heat pump dehumidifier, generally referred to as 199 includes the desuperheater 128 and a subcooler 126, which are in fluid communication with the condensers 172 and evaporator 174 by way of refrigeration lines 197 that are in fluid communication with the accumulator 152, the high pressure receiver 150 and refrigeration lines 197. The subcooler 126 is in fluid communication with the condensers 172 and is installed in series with the condensers 172. The benefit of using subcooler 126 for heat rejection this way is that it increases the capacity and the energy efficiency of the heat pump. The desuperheater 128 is used as a backup to provide additional heat rejection under some conditions, such as on a hot day when the subcooler 126, may not be able to provide sufficient heat rejection.

As shown in FIG. 5, in use, air that has left the product 200 is heated as it passes through the condensers 172, prior to being returned to the entry end 202 of the product stack 204. The required air movement is generated by the bank of fans 192. Some of the air that leaves the product 200 (about 15% of the total air-flow) passes through the evaporator 174. Here that air stream is cooled, dropping its temperature and condensing moisture as it does so. That liquid moisture, extracted from the product 200, is collected at the base of the evaporator 174 and piped to the outside through the moisture discharge pipe 166 (FIG. 3). The cooled air from the evaporator 174 and heated air from the condensers 172 are mixed together, and are conducted back to the product stack entry 200. The evaporator 174 and condensers 172 are configured to provide parallel air flows. This allows the air-flow to be reversed periodically (using the reversible fans 184), so that drying in the product stack 204 is acceptably uniform over the whole length of the stack. In addition, the return air-flow is split into two air-streams, an upper air stream 210 that is above the stack 204 and a lower air stream 212 that is below the stack 204. The reason for doing this is to improve the distribution of air-flow across the product stack, so as to ensure all parts get dried at a similar rate.

As described above, the fans 184 circulate the drying air-flow sequentially through the product stack 200 and the evaporator 174 and the two condensers 172. One of the problems that can arise in this arrangement is that the air speed returning to the product entry may often not be uniform across the product entry. This may result in some of the product drying faster than the rest, which is undesirable. The use of a number of fans improves the uniformity of the air-streams returning to the product entry. The fans are selected for their size, fan blades and rotation speed to deliver a specific volume of air per second that is matched to the heat pump capacity and to the required drying speed of the product. This air-flow is what couples the heat pump to the product. Variations in the air volume flow rate of 10% up or down are not significant, but larger variations may affect the performance. Further, the air mixing space 71 (FIG. 4) promotes mixing of the air to provide air to the product 200 that is substantially the same temperature upon leaving the air mixing space 71. Environmental sensors (temperature sensors 220 and relative humidity sensors 222) are located in the supply air stream 224 and return air stream 210, 212.

The dehydrator plant 4 can hold about 2250 kilograms (kg) of product per batch. The material to be dried is preferably of a thickness 10 millimeter (mm) or less in whole or cuts or puree. The product is dried from about 85 percent moisture content to about 8 percent moisture content in the closed loop system at temperatures, for example, between about 25° C. to about 50° C., or about 30° C. to about 40° C., to retain their original nutrients, colour and flavour.

The details of the components of the dehydrator are as follows. A 1,1,1,2-tetrafluoroethane (R134a)-based refrigeration cycle is designed to provide dehumidification by delivering 508.6 cubic metres per minute [17,957 standard cubic feet per minute (SCFM)] of air.

The compressor 148 is a scroll compressor that is equipped with a crankcase heater, factory mounted check valve and oil charge. Compressor safety and instrumentation include low and high pressure cutout, high discharge temperature cutout, pressure sensors, and gauges.

The bank 192 of single-speed, true-reversible axial fans 184 provide 508.6 cubic metres per minute [17, 957 standard cubic feet per minute (SUM)] to satisfy airflow rate required by the process. Each fan 184 delivers 2,993 CFM. In order to balance the heat load during operation the refrigeration control system initiates external heat rejection features, sub-cooling and desuperheating as required. The fans 184 provide mixing when the air-flow is clockwise. In clockwise air circulation the air flows from the condensers 172 and the evaporator 174 to the fans 184, and from the fans 184 to the product stack 204. The rear ductless air channel 52 returns the air to the air conditioning chamber 20 through the upper and lower air ductless channels 32, 38, and the cycle continues. The air that enters the fans 184 comes from both the evaporator 174, which supplies cold air, and the condensers 172, which supply hot air, hence the fans mix the air, resulting in air of a uniform temperature reaching the product stack 204. In counterclockwise circulation, the air that leaves the condensers 172 and evaporator 174 goes into the upper and lower ductless air channels 32, 38. These are long enough that the hot and cold air will be mixed before the air enters the product stack 204.

Airflow to the evaporator 174 is set by opening or closing the dampers 178. This is preferably automatic.

The subcooler 126 is installed in series with the condensers 172. A pressure differential will divert the refrigerant through the subcooler 126 on an as need basis for external heat rejection. During the drying mode the subcooler fans modulate to control the temperature of the air entering the drying chamber 8 at a preset value. The subcooler controls the rate of heat rejection, the purpose being to prevent the drying temperature getting too high. As long as the subcooler 126 is able to maintain the selected temperature in the drying chamber 8, the desuperheater 128 is not used, as the subcooler 126 is more energy efficient and contributes to the system drying capacity. This is under control of the control panel 156.

In use, the dehydrator plant 4 is moved to where the produce is grown or stored. The front doors 12 are opened and the equipment module 10 is slid out of the intermodal container 6 so that the refrigeration equipment chamber 18 is exposed to the ambient 92. The produce is loaded into the drying chamber 8. The operator sets the temperature using the operator interface terminal 15 once the product has been loaded into the container. The control panel 156 activates the heater 177 and fans 184 to bring the overall temperature of the drying chamber 8 a preset temperature of about 25° C. It is then turned OFF before turning ON the heat pump dehumidifier 199. Based upon the temperature, the control panel 156 sends instructions to the sub-cooler to modulate the temperature, either by increasing the cooling or decreasing the cooling. If the temperature of the ambient environment is too high for the subcooler 126 to adequately control the temperature, the desuperheater 128 will be used as well.

Once the drying is completed (about 24 hours or less), the dried product is removed, at least one of the carts 21 is folded or rearranged and the equipment module is retracted into the intermodal container 6 so that it is stored in the drying chamber 8 and the doors 12, 14 of the intermodal container 6 are closed. The fully self-contained dehydrator plant 4 is then ready for transport or storage.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize, or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A self-contained, portable product dehydrator comprising: an intermodal container including a rear door, a front door, a ceiling, a floor, and walls therebetween to define an interior; an equipment module, the interior housing the equipment module, the equipment module including a refrigeration equipment chamber proximate the front door and an air conditioning chamber behind the refrigeration equipment chamber, the equipment module retained in the interior and moveable from a retracted position to an extended position, wherein when in the extended position, the refrigeration equipment chamber is substantially exposed to an ambient environment, outside the front door; a heat pump dehumidifier including a subcooler, a desuperheater, at least two condensers, a compressor, an expansion valve and an evaporator, all in fluid communication; the subcooler, the desuperheater, the expansion valve and the compressor housed in the refrigeration equipment chamber and the at least two condensers and the evaporator housed in the air conditioning chamber, the air conditioning chamber including a front partition wall and a bank of fans in the rear wall, the bank of fans in fluid communication with the air conditioning chamber and the drying chamber; a drying chamber, the drying chamber defined by the interior and the rear door; and a motor control center and a control panel, both in electronic communication with the heat pump dehumidifier and the fans.

2. The dehydrator of claim 1, further comprising a racking system, the racking system housed in the drying chamber, the racking system including a plurality of carts, each with a plurality of racks, and a plurality of trays, the trays releasably retained on the racks.

3. The dehydrator of claim 2, wherein the racking system and the ceiling define an upper ductless air channel, the racking system and the floor define a lower ductless air channel and the racking system and the rear door define a rear ductless air channel, the rear ductless air channel in fluid communication with the upper and the lower air channels, the air channels in fluid communication with the bank of fans.

4. The dehydrator of claim 3, wherein the evaporator and the condensers are mounted on a partition wall between the air conditioning chamber and the refrigeration equipment chamber to provide a barrier to air.

5. The dehydrator of claim 4, further comprising a pair of adjustable dampers, each damper mounted in an air channel, such that an amount of air flow to the evaporator and to the condensers is modulated.

6. The dehydrator of claim 5, wherein the equipment module is in slidable and rollable engagement with the intermodal container.

7. The dehydrator of claim 6, wherein the heat pump dehumidifier further includes a plurality of valves including an electronic expansion valve, the plurality of valves housed in the refrigeration equipment chamber.

8. The dehydrator of claim 7, further comprising a louvered door in a wall of the refrigeration equipment chamber.

9. The dehydrator of claim 8, further comprising an air mixing space defined by the evaporator of the air conditioning chamber and the bank of fans, the air mixing space in fluid communication with the bank of fans and the upper and the lower ductless air channels.

10. The dehydrator of claim 9, wherein the fans are reversible fans.

11. The dehydrator of claim 10, further comprising a motor control center and a control panel in electronic communication with the heat pump dehumidifier, for controlling the heat pump dehumidifier.

12. The dehydrator of claim 11, further comprising environmental sensors, the sensors in electronic communication with the control panel.

13. A method of drying a food product, the method comprising using the dehydrator of claim 1 to dry the food product.

14. The method of claim 13, wherein the food product is dried from about 85 percent moisture content to about 8 percent moisture content at a temperature between about 25° C. to about 50° C.

15. A self-contained, portable product dehydrator comprising: an intermodal container including a rear door, a front door, a ceiling, a floor, and walls therebetween to define an interior; an equipment module, the interior housing the equipment module, the equipment module retained in the interior and moveable from a retracted position to an extended position, wherein when in the extended position, a front portion of the equipment module is substantially exposed to an ambient environment, outside the front door; a heat pump dehumidifier housed in the equipment module, the equipment module including a rear wall; a drying chamber, the drying chamber defined by the interior and the rear door; a bank of fans, the bank of fans located in the rear wall and in fluid communication with the equipment module and the drying chamber; and a motor control center and a control panel, in electronic communication with the heat pump dehumidifier and the fans.

16. The dehydrator of claim 15, wherein the equipment module includes: a refrigeration equipment chamber which is substantially exposed to the ambient when in the extended position, the equipment chamber proximate the front door; and an air conditioning chamber behind the refrigeration equipment chamber.

17. The dehydrator of claim 16, wherein the heat pump dehumidifier includes a subcooler, a desuperheater, at least two condensers, a compressor, an electronic expansion valve and an evaporator, all in fluid communication; the subcooler, the desuperheater, electronic expansion valve and the compressor housed in the refrigeration equipment chamber and the at least two condensers and evaporator housed in the air conditioning chamber.

18. The dehydrator of claim 17, further comprising a racking system, the racking system housed in the drying chamber, the racking system including a plurality of carts, each with a plurality of racks, and a plurality of trays, the trays releasably retained on the racks.

19. The dehydrator of claim 18, wherein the racking system and the ceiling define an upper ductless air channel, the racking system and the floor define a lower ductless air channel and the racking system and the rear door define a rear ductless air channel, the rear ductless air channel in fluid communication with the upper and the lower air channels, the air channels in fluid communication with the bank of fans.

20. The dehydrator of claim 19, wherein the equipment module is in slidable and rollable engagement with the intermodal container.

\* \* \* \* \*